July 16, 1929.  A. ERICSON  1,721,011
ROAD DITCH CLEANING ATTACHMENT FOR TRACTORS
Filed April 30, 1928  2 Sheets-Sheet 1
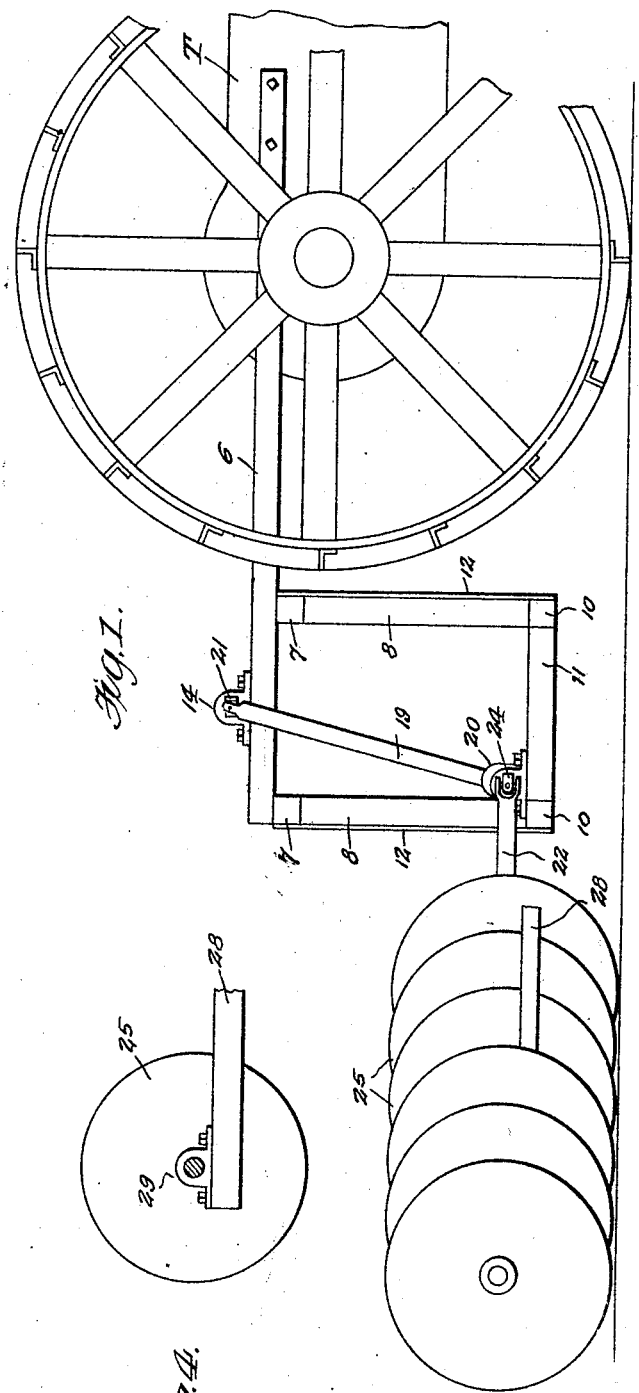
Inventor
August Ericson,
By Clarence A. O'Brien
Attorney July 16, 1929.   A. ERICSON   1,721,011
ROAD DITCH CLEANING ATTACHMENT FOR TRACTORS
Filed April 30, 1928   2 Sheets-Sheet 2
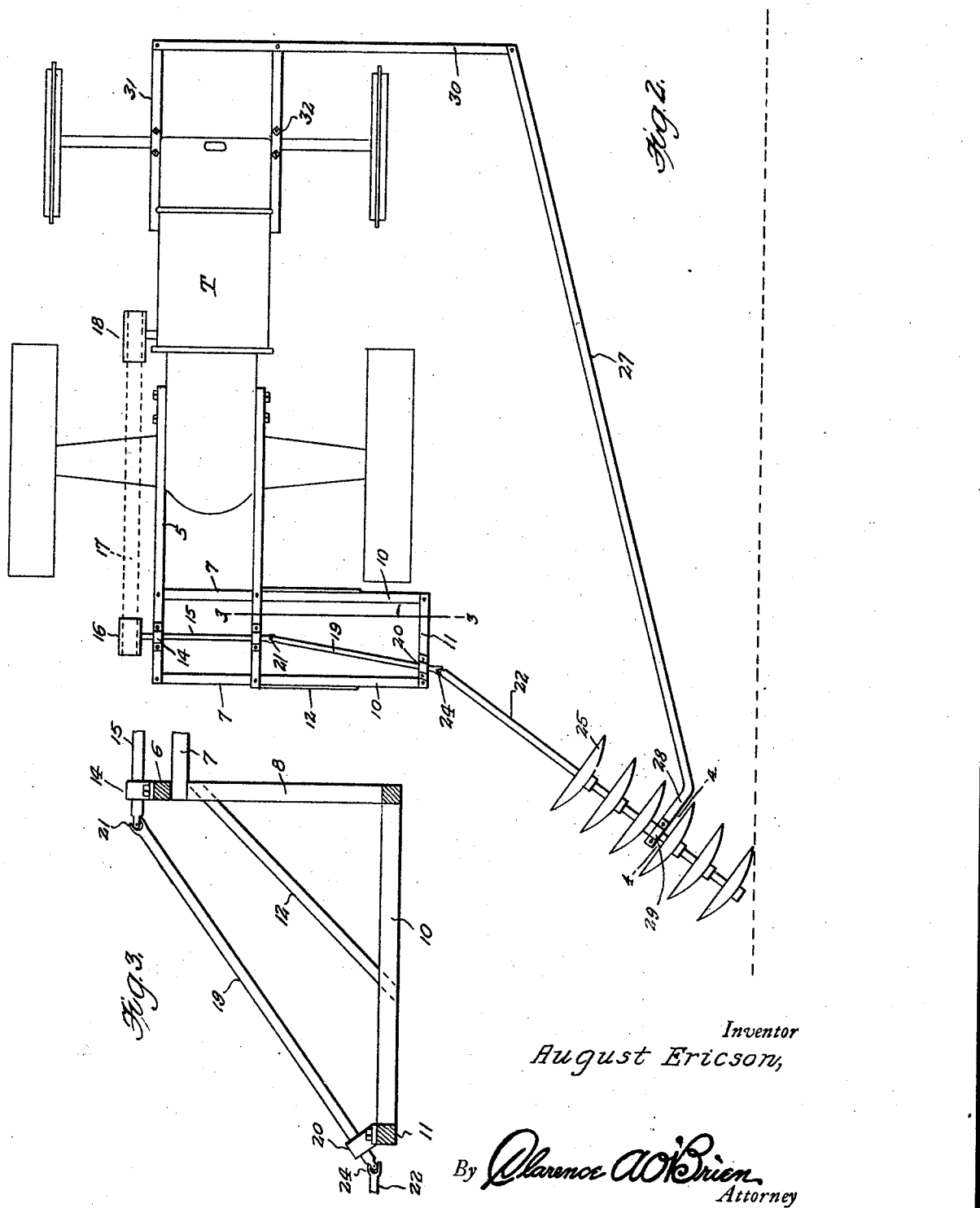
Inventor
*August Ericson,*
By *Clarence A. O'Brien*
Attorney Patented July 16, 1929.

1,721,011

UNITED STATES PATENT OFFICE.

AUGUST ERICSON, OF CAMBRIDGE, ILLINOIS.

ROAD-DITCH-CLEANING ATTACHMENT FOR TRACTORS.

Application filed April 30, 1928. Serial No. 274,127.

The present invention relates generally to tractors and has for its prime object to provide an attachment therefor whereby ditches alongside of roads may be cleaned by a plurality of rotating discs.

Another very important object of the invention resides in the provision of an attachment of this nature which is comparatively inexpensive to construct and install and compact and convenient in its arrangement of parts.

A still further very important object of the invention resides in the provision of an attachment of this nature, which is comparatively simple in its construction, strong and durable, thoroughly efficient and reliable in use and operation and otherwise well adapted to the purpose for which it is designed.

With the above and numerous other objects in view, as will appear as the description proceeds, the invention resides in certain novel features of construction and in the combination and arrangement of parts as will be hereinafter more fully described and claimed.

In the drawing:

Figure 1 is a side elevation of the attachment, showing the rear portion only attached to the tractor.

Figure 2 is a top plan view thereof.

Figure 3 is a vertical detail transverse section taken substantially on the line 3—3 of Figure 2.

Figure 4 is an enlarged detail section taken substantially on the line 4—4 of Figure 2, and Figure 5 is a perspective view of the apparatus attached to the front of the tractor.

Referring to the drawing in detail, it will be seen that the letter T denotes generally a tractor of conventional construction. A pair of bars 5 and 6 are secured to the rear portion of the tractor and extend rearwardly therefrom in spaced parallelism. A pair of spaced parallel cross bars 7 connect the rear portions of the bars 5 and 6. Bars 8 depend from the extremities of the bars 7 adjacent the bar 6, and are connected by a bar (not shown) at their lower ends. Bars 10 project laterally from the lower extremities of the bars 8 and are connected by a bar 11. The bars 10 are braced with respect to the bars 8 by diagonal braces 12. Bearings 14 are mounted on the bars 5 and 6 between the bars 7 and have the shaft 15 journaled therein with the pulley 16 at the outer end, over which a belt 17 may be trained and also trained over the pulley 18 of the tractor T. A shaft 19 is journaled in a bearing 20 on the bar 11 and has a universal connection 21 with the inner end of the shaft 15. A shaft 22 has the universal connection 24 with the shaft 19 and has a plurality of discs 25 thereon to be rotated thereby.

An arm 27 has an offset end 28 with a bearing 29 on an intermediate portion of the shaft 22, between intermediate discs 25. This arm 27 extends forwardly and is attached to a cross bar 30, extending in front of the tractor and engaged with a pair of longitudinally and rearwardly extending bars 31, which are attached to the sides of the forward portion of the tractor T by means of U-bolts 32, or in any other preferred manner.

From the above detailed description, it will be seen that I have provided an exceedingly simple yet sturdy structure, whereby the tractor may be run along the road and the discs run in the ditch alongside of the road, said discs rotating at a relatively great rate of speed, thereby thoroughly cleaning the ditch. Of course this apparatus may be used in numerous other different ways as will be quite apparent to those skilled in this art.

It is thought that the present embodiment of the invention will now be clearly understood without a more detailed description thereof.

This embodiment has been disclosed merely by way of example, since in actual practice it attains the features of advantage enumerated as desirable in the statement of the invention and the above description. It will be apparent that changes in the details of construction and in the combination and arrangement of parts may be resorted to, without departing from the spirit of the invention as hereinafter claimed or sacrificing any of its advantages.

Having thus described my invention, what I claim as new is:

1. An attachment for a tractor comprising a pair of bars fixed to the rear of the tractor to extend rearwardly therefrom in spaced parallelism, a frame structure depending from the rear portion of the bars, said frame structure having a lateral extension, a shaft journaled on the bars, means operatively connecting the shaft with the tractor, a shaft universally connected with the first mentioned shaft and journaled in the lateral extension, a third shaft universally connected with the second mentioned shaft and having a plurality of discs thereon.

2. An attachment for a tractor comprising a pair of bars fixed to the rear of the tractor to extend rearwardly therefrom in spaced parallelism, a frame structure depending from the rear portion of the bars, said frame structure having a lateral extension, a shaft journaled on the bars, means operatively connecting the shaft with the tractor, a shaft universally connected with the first mentioned shaft and journaled in the lateral extension, a third shaft universally connected with the second mentioned shaft and having a plurality of discs thereon, an arm engaged with the last mentioned shaft and projecting forwardly and a frame for attachment to the forward portion of the tractor and having a laterally extending bar with which the arm is connected.

In testimony whereof I affix my signature.

AUGUST ERICSON.